Patented Apr. 6, 1948

2,439,212

UNITED STATES PATENT OFFICE 2,439,212

DITHIADECANE DIESTER

Henning Waldemar Jacobson, Wilmington, Del., assignor to E. I. du Pont de Nemours & Company, Wilmington, Del., a corporation of Delaware No Drawing. Application October 10, 1946, Serial No. 702,364

1 Claim. (Cl. 260—488)

This invention relates to esters.

This invention has as an object the preparation of a new class of esters. A further object is the preparation of new lubricating compositions. Other objects will appear hereinafter.

These objects are accomplished by the following invention of esters of 4,7-dithiadecane-1,10-diol with organic acids, preferably fatty acids of up to eighteen carbon atoms and still more preferably fatty acids of two to seven carbon atoms.

The following examples in which parts are by weight are illustrative of the invention.

Example

To a solution of 53 parts of 4,7-dithiadecane-1,10-diol and 110 parts of warm benzene is added 80 parts of 2,2,3-trimethylbutanoyl chloride and the solution is warmed on a steam bath. When the reaction is completed as evidenced by the cessation of hydrogen chloride evolution, the reaction mixture is washed with water and 10% aqueous sodium bicarbonate solution, and the benzene is removed by distillation. The ester is distilled at a pressure of 0.01 mm. of mercury discarding the first three parts which distill at a bath temperature of about 130° C. The bath temperature is then raised to 180°-190° C. and 90 parts of pale-yellow-colored ester distills. This This represents a yield of 82.5% of 4,7-dithiadecane - 1,10 - diol - bis - (2,2,3-trimethylbutanoate). Analysis: Calculated for $C_{22}H_{42}S_2O_4$: S, 14.74%; found, S, 13.72, 13.37, 13.46%. This ester has a viscosity (Saybolt Universal seconds) of 180.5 at 100° F.; 47.1 at 210° F. and a viscosity index of 122.5.

The 4,7-dithiadecane-1,10-diol is prepared as follows: Into a glass reaction vessel having a high transparency to ultraviolet light and provided with a reflux condenser is charged 188 parts of ethanedithiol, 232 parts of allyl alcohol and 0.5 part of benzoyl peroxide. On irradiating with ultraviolet light the reaction begins as evidenced by the evolution of heat sufficient to produce refluxing. Irradiation is continued for about 24 hours, at the end of which time the addition of the dithiol to the unsaturated alcohol is almost complete as indicated by an analysis for residual thiol. When the reaction mixture is diluted with an equal volume of benzene and petroleum ether (1/1 mixture) and cooled, there is obtained 238 parts or a 55.6% yield of 4,7-dithiadecane-1,10-diol. This compound melts at 49-52° C. after recrystallization from benzene.

The addition of the unsaturated alcohol to the thiol can be carried out under the influence of ultraviolet light with a peroxide catalyst without external heating. Also the heating together of the unsaturated alcohol with the dithiol is sufficient to bring about the reaction.

The 4,7-dithiadecane-1,10-diol esters of this invention can be prepared by esterifying the diol with the usual esterifying agents. For example, in addition to the acid chloride of the above example, other esterifying agents can be used, e. g., acetic, propionic, butyric, caprylic, lauric, stearic, acrylic, methacrylic, oxalic, succinic, adipic, citric, benzoic, phthalic acids; acetic, propionic, phthalic anhydrides; acetyl chloride and benzoyl chloride. The esterification can be conducted in accordance with esterifying methods well known in the art. Esters of fatty acids of two to seven carbon atoms are the most preferred. In addition to the fully esterified diesters of a single acid, mixed esters can be obtained by using a mixture of acids to esterify the glycol. Monoesters can also be prepared by reacting the glycol with smaller quantities of acid than necessary to esterify both hydroxyls and separating the monoester by distillation or other suitable method.

The low-boiling esters of this invention can be used as solvents, whereas the high-boiling esters can be used as plasticizers and synthetic lubricating oils.

The foregoing detailed description has been given for clearness of understanding only and no unnecessary limitations are to be understood therefrom. The invention is not limited to the exact details shown and described for obvious modifications will occur to those skilled in the art.

What is claimed is:

4,7-Dithiadecane-1,10-diol bis(2,2,3-trimethylbutanoate).

HENNING WALDEMAR JACOBSON.

REFERENCES CITED

The following references are of record in the file of this patent:

UNITED STATES PATENTS

| Number | Name | Date |
| --- | --- | --- |
| 2,356,586 | Hentrich et al. | Aug. 22, 1944 |

OTHER REFERENCES

Rojahn: "Chemical Abstracts," vol. 20, page 737 (1926).

Locquin et al.: "Bull. Soc. Chim de France," (4), vol. 39, page 436 (1927).